United States Patent Office 3,333,923
Patented Aug. 1, 1967

3,333,923
METHOD FOR PRODUCING NITRIC OXIDE
Earl Leatham, Wexford, Pa., and Albert H. Pack and William W. Campbell, Ludington, Mich., assignors to Harbison-Walker Refractories Company, Pittsburgh, Pa., a corporation of Pennsylvania
No Drawing. Filed Jan. 24, 1964, Ser. No. 339,869
3 Claims. (Cl. 23—163)

ABSTRACT OF THE DISCLOSURE

This invention is directed to the production of nitric oxide by continuously feeding uniformly sized briquettes to a shaft or vertical kiln to provide a continuously descending bed. Air is introduced through the bottom of the kiln and is directed upwardly through the bed. The combustion zone is maintained at about 4000° F. and higher to convert the nitrogen in the air to nitric oxide. The resulting nitric oxide passes upwardly through the continuous flow of cool briquettes to prevent decomposition and is recovered.

---

The present invention relates to a method of producing nitric oxide.

There has been a great deal of investigation of the fixation of atmospheric nitrogen. Many processes have been suggested but most of them have not appeared to be commercially feasible. The prior art processes all seem to be based upon the tendency of nitrogen in the air to combine with oxygen to form nitric oxide (NO) at temperatures above 3270° F. The reaction formula is believed to be $N_2+O_2=2NO$. The rate at which this reversible reaction progresses is so rapid, that the greater part of the NO formed in a high temperature reaction zone is decomposed during the process of cooling to ambient temperatures.

In processes for the thermal fixation of atmospheric nitrogen as nitric oxide, after the high temperature reaction has progressed to near equilibrium, maintenance of this condition, during the ensuing cooling of the gaseous reaction mixture, requires precise control of cooling rates. At least the first few hundred degrees cooling should be effected with great alacrity. In the industrial application of the present invention, it is desirable to "quench" or "chill" the reaction gas mixture.

Heretofore, it has been proposed to employ a one or two pebble bed heat exchanger consisting of refractory pebbles utilizing either a unidirectional or a reversible air flow reaction zone. The pebble beds have been arranged so that one pebble bed constituted a reaction zone and the other constituted a cooling zone, both being within the same chamber, or interconnected chambers. The chilling bed or zone, owing to its stationary nature is gradually heated by reason of the heat transfer from air and gases continuously passing therethrough from the reaction zone.

The pebbles employed in the foregoing beds have been size graded, larger pebbles being in the reaction zone and smaller pebbles in the chilling zone. It has been suggested that the reaction zone temperature be maintained in the range 3800 to 4000° F. It has been discovered that, with the above process, the nitric oxide reaction is not as complete as that desired for optimum recovery, and that the effluent gases are cooled at a rate of only 80,000° F. per second. According to the present invention, it is believed that the gases may be cooled at a rate on the order of about 150,000° F. per second; however, this is only an approximation.

The process of this invention is carried out in a refractory lined tubular chamber through which passes a rapidly moving bed of periclase pebbles in countercurrent flow to air and reaction gases. This can be considered a type of shaft kiln. The successful operation of such a shaft kiln depends primarily on the ability to move the charge or bed of refractory pebbles at a constant rate down through the reaction zone while inducing movement of air or an oxygen and nitrogen containing gas mixture upwardly through the kiln countercurrent to the movement of the bed. The proper countercurrent balance of feeding air and feed has been thought to be governed by the porosity of the charge and the temperature of the reaction zone. With a maintained uniform size of refractory pebble or shape throughout the bed, and a minimum amount of fine particles ($-\frac{1}{4}$ inch), the packing of the bed moving through the kiln will be such that little difficulty is encountered in inducing the required rate of air flow through a descending load.

The velocity of the gases moving from the reaction zone into the upper and cooler parts of the kiln decreases as the gas cools. As long as the desired porosity or expansion of the bed remains constant, this decrease of velocity is not significant. However, in a shaft kiln of approximately 20 ft. vertical extent, in which the reaction zone is about at the middle, there should be sufficient air moving in through the bottom of the kiln to completely burn the fuel introduced at the reaction zone and obtain a temperature above 4000° F. plus an excess of air or oxygen in order to obtain a substantially complete nitrogen-oxygen reaction. It is preferable that the oxygen be present in an amount slightly in excess of that required to stoichiometrically combine with all the nitrogen present; for example, 1.1 parts $O_2$ per 1 part $N_2$.

Further, by employing a relatively rapidly descending bed of refractory pebbles or shapes, a continuous supply of new pebbles can be supplied to the cooling zone, and excessively heated ones can be continuously discharged at the bottom of the kiln. Since the effluent reaction gases will be passing through relatively cold pebbles, it follows that the gases will be chilled much more rapidly than by the methods heretofore employed, to thereby preclude the decomposition of the product nitric oxide.

It is among the objects of this invention to provide a novel method for producing nitric oxide.

Briefly, in accordance with the invention, there is provided a novel method of producing nitric oxide in a shaft type kiln. The method includes feeding a plurality of uniformly sized pebbles or shapes consisting of about 97% MgO+CaO, by weight, based on an oxide analysis, to a shaft kiln in the form of a continuously descending bed. An upwardly moving stream of air or oxygen enriched air is introduced through the bottom of the kiln. A satisfactory feed rate for the shapes is on the order of 1 lb. per lb. of air. Sufficient fuel, such as natural gas, is introduced at the combustion zone near the center of the kiln, within the descending bed, to provide a temperature of 4000° F. and higher. The temperature is sufficient to cause substantially theoretically reaction of nitrogen and oxygen remaining from the combustion process to form nitric oxide from the stream of air.

More specifically, almond-shaped briquettes (about 1.5 x 1.5 x 0.75″ in dimension) of at least 97% MgO +CaO content, by weight on the basis of an oxide analysis, are prepared from materials of the group dolomite, magnesia or magnesite (we use these terms synonymously herein), and lime. These materials may be natural or synthetic, caustic calcined, dead burned, or in the carbonate form. (Reference to synthetic material describes materials such as magnesia which is recovered from seawater and similar brines.) The briquettes are heated to a temperature sufficient to obtain a bulk specific gravity of at least 2.

A satisfactory shaft type kiln for the practice of this invention can be, for example, on the order of about 20 ft. in height. The briquettes are fed at a rate of about one lb. per lb. of air. The briquettes are fed in such a manner as to provide a continuously descending bed, with the amount of new, cool briquettes being fed in at the top of the kiln being equivalent to the amount being discharged at the bottom. Fuel, such as natural gas, is introduced to the combustion zone of the kiln at a rate of about 1½ to 2 million BTU's per ton of briquettes or shapes discharged from the bottom. The foregoing material balance assures a temperature of at least about 4000° F., and up to about 4500° F. in the burning zone of the kiln.

The refractory pebbles or shapes used for the practice of this invention should be carefully sized. For example, at least 90%, by number, should be ¼ to 2". These dimensions refer to the maximum diameter or width of a given particle. It is also preferred that the refractory shapes in any given bed be uniformly sized within this range. The uniform sizing within a particular particle size range is to insure a sufficient number of interstices through which the upwardly moving air may flow to the combustion and cooling zones. Also, cross-sectional uniformity of temperature within the combustion zone, and rapid chilling in the cooling zone are facilitated.

As the air moves upwardly through the combustion zone (which is held at a temperature above 4000° F.) the nitrogen and oxygen in the air react to form nitric oxide. The nitric oxide is rapidly chilled by passing through the descending bed of relatively cool refractory shapes. Substantially all of the nitric oxide formed leaves the kiln without decomposition to oxygen and nitrogen. The nitric oxide gas is then passed to a recovery system to be concentrated.

We speak of the necessity of relatively cool refractory shapes or pebbles. By "cool" we mean at least 2000° F. cooler than the combustion zone of the kiln. Of course, the cooler the shapes or pebbles, the more rapid the chilling of the nitric oxide rising from the combustion zone which will provide higher yields.

A recovery system we suggest for the practice of this invention may consist of an oxidation and adsorption chamber and an acid tower, both of which are sequentially connected to an outlet manifold at the top of the kiln. In the adsorption chamber the nitric oxide gas is contacted by a catalyst which has been deposited on a porous adsorbent carrier. Usually the carrier has a surface area of at least 50 sq. meters per gram. Preferably, the catalyst is nonvolatile. Particularly effective catalysts are iodine pentoxide and chromium trioxide.

Catalysts are present on the carrier in relatively small amounts, usually in the range of from 1 to 10%, by weight, based on the total weight of the catalyst and carrier. The porous carrier or support can be, for instance, silica gel, silica-alumina, and activated carbon. The catalyst serves to hasten oxidation of the nitric oxide (NO) to the more stable form nitrogen dioxide ($NO_2$). The porous adsorbent carrier is heated and nitrogen dioxide is driven off. This gas is passed into the acid tower, where water is added and nitric acid formed.

Since certain changes in carrying out the above process may be made without departing from its scope, it is intended that the accompanying description be interpreted as illustrative and not limiting.

We claim:
1. A method for producing nitric oxide comprising continuously feeding a plurality of uniformly sized relatively cool briquettes consisting of refractory material, to a shaft kiln to provide a continuously descending bed therein, introducing an upwardly moving stream of air through the bottom of the kiln, the feed rate of the briquettes being on the order of 1 lb. per lb. of air, introducing sufficient fuel to a combustion zone intermediate the ends of the kiln within the descending bed to provide a temperature of at least 4000° F., said temperature being sufficient for a fixation of nitrogen from the stream of air, as nitric oxide, the cool briquettes substantially preventing the decomposition thereof, recovering the nitric oxide produced and removing the heated briquettes from the kiln.

2. The method of claim 1 in which the temperature is at least 4500° F.

3. The method of claim 1 in which the briquettes have a diameter in the size range ¼ to 2 inches, and at least 90% of the number of briquettes having substantially a uniform diameter.

References Cited

UNITED STATES PATENTS

| | | | |
|---|---|---|---|
| 2,512,259 | 6/1950 | Pike | 23—163 X |
| 2,657,116 | 10/1953 | Daniels | 23—163 |
| 2,674,338 | 4/1954 | Lindsay et al. | 23—157 |
| 2,776,872 | 1/1957 | Norton | 23—163 X |
| 2,954,415 | 9/1960 | Topsoe | 23—163 X |
| 3,050,363 | 8/1962 | Veal | 23—157 |
| 3,079,232 | 2/1963 | Andersen et al. | 23—157 |

OSCAR R. VERTIZ, *Primary Examiner.*

B. H. LEVENSON, *Assistant Examiner.*